No. 710,552. Patented Oct. 7, 1902.
C. H. AMIDON.
STEAM COOKER.
(Application filed Oct. 5, 1900.)

(No Model.)

Witnesses:
C. B. Butler
A. J. Leid

Inventor.
Charles H. Amidon
By W. T. Miller
Attorney.

UNITED STATES PATENT OFFICE.

CHARLES H. AMIDON, OF BUFFALO, NEW YORK.

STEAM-COOKER.

SPECIFICATION forming part of Letters Patent No. 710,552, dated October 7, 1902.

Application filed October 5, 1900. Serial No. 32,079. (No model.)

*To all whom it may concern:*

Be it known that I, CHARLES H. AMIDON, a citizen of the United States, residing at Buffalo, in the county of Erie and State of New York, have invented certain new and useful Improvements in Steam-Cookers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in cookers, and more particularly to that class in which steam is employed as the cooking agent.

The primary object of my invention is to automatically maintain a practically constant supply of water in the steam-generating receptacle, into which it is fed from an adjacent surrounding supply-reservoir.

Another object of my invention is to provide adjustable means for varying the supply of water to be automatically maintained in the steam-generating receptacle.

Another object of my invention is to provide an improved vessel in which food is boiled adapted for joint use with my improved cooker, said vessel being so constructed that the grease will be kept therein, while the water is allowed to overflow.

To these ends my invention consists of certain details of construction, all of which will be fully hereinafter described and claimed.

Figure 1:
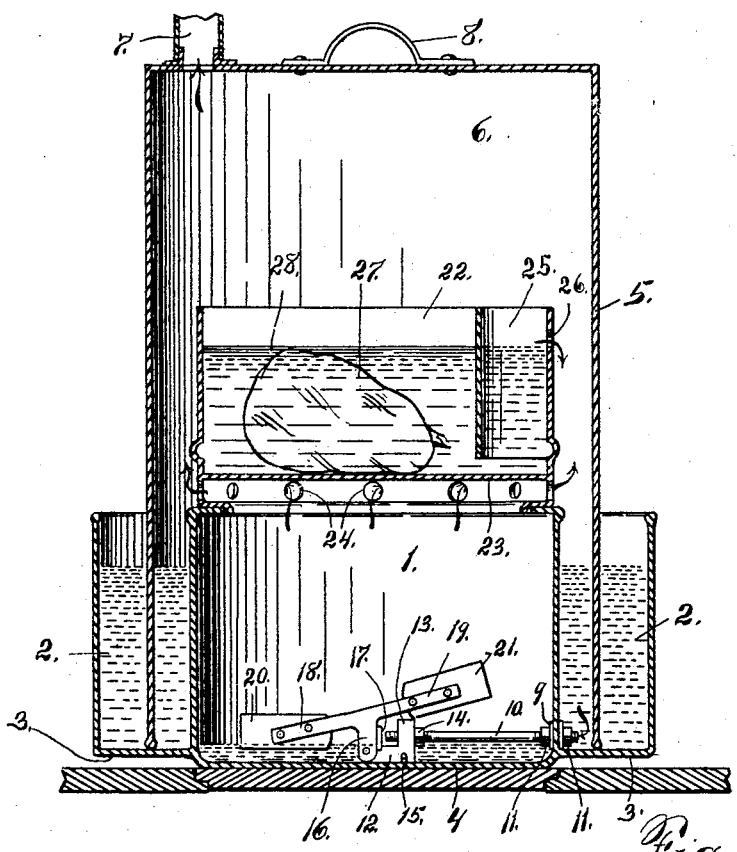
Figure 2:
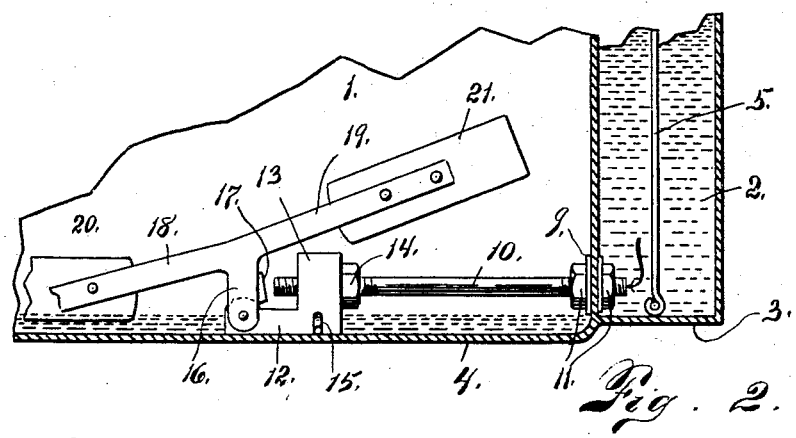

In the drawings, Figure 1 is a central vertical section of the assembled steam-generating receptacle, surrounding supply-reservoir, and cover, showing the application thereto of my invention and the improved cooking vessel in position upon the steam-generating receptacle. Fig. 2 is a similar enlarged fragmentary section, showing the working parts in the steam-generating receptacle.

Referring to the drawings, 1 is the preferably cylindrical receptacle in which the steam is generated. Surrounding the receptacle and with outer wall of the same height is the annular reservoir 2, with its floor 3 slightly raised above the level of the floor 4 of the receptacle 1.

5 is the cover which forms the cooking-chamber 6, it being made sufficiently higher than the receptacle 1 to admit of the free reception of the cooking vessel, which rests upon the receptacle 1. This cover when in position extends down to and rests upon the floor 3 of the reservoir 2, as clearly shown in the drawings, the water in the reservoir forming a tight joint to prevent the downward escape of steam. 7 is a discharge-passage opening out of the top of the cover 5 to permit of the escape of surplus steam, and 8 is the handle for raising the cover.

Communication between the reservoir 2 and the steam-generating receptacle 1 is arranged as follows: In the side wall of the receptacle 1 is placed a socket 9, with which the supply-pipe 10, open at both ends, has screw-threaded engagement, it being locked in position by the nuts 11 11. This supply-pipe 10 extends inwardly to a point near the center of receptacle 1. A frame consisting of the horizontal arm 12 and vertical arm 13 rests loosely upon the floor of the receptacle 1. The inner end of the supply-pipe 10 passes through the vertical arm 13, having adjustable screw-threaded engagement therewith, the lock-nut 14 being used to maintain a tight engagement. This inner open end of the supply-pipe extends slightly beyond the vertical arm 13, as shown. A stiff wire 15 is passed through the lower end of the vertical arm, extending outwardly and downwardly to the floor of the receptacle 1 on each side thereof, its outer ends resting upon the floor at some distance from the vertical arm to prevent the accidental tipping of the loose frame. At the outer end of the horizontal arm 12 is pivoted the lower end of the arm 16, carrying the rubber valve-seat 17, adjacent to the inner open end of the supply-pipe 10. At the upper end of arm 16 are the arms 18 and 19, extending in opposite directions. The outer end of arm 18 has attached thereto the float 20, made of any suitable buoyant material, and the outer end of arm 19 has attached thereto the counterweight 21 for overcoming any submersion of the float 20, thereby keeping its under surface practically in contact with the surface of the water which is being converted into steam in the receptacle 1.

22 is the cooking vessel to be used in connection with my improved apparatus, as just described. It is preferably cylindrical in form and rests upon the steam-generating receptacle 1, as shown. The bottom 23 of this vessel is raised slightly above the lower edge of the cylindrical wall in order to provide for a series of openings 24 for the escape of steam from the receptacle 1, or, if preferred, the bottom 23 may rest directly upon the receptacle 1, in which event openings can be provided in the wall of the receptacle 1 for the escape of steam. Within the vessel 22 and at one side thereof is the small compartment 25, which does not extend quite to the bottom 23 of the vessel, its lower end being open and in communication with the lower portion of the vessel. Near the top of this compartment 25 are placed one or more overflow-openings 26. The object of this construction is to prevent the overflow and escape of the grease or fatty matter which rises to the surface of the water in which meat is being boiled. In the drawings the grease which is thrown off from the ham 27 which is being boiled is represented by the layer 28 of lines drawn closely together at the top surface of the water. It is prevented from escaping by the wall of the compartment 25, while the water in the vessel 22, which lies below the grease, can escape up the compartment 25 and out of the overflow-openings 26.

In operation the water from the reservoir 2 flows into the receptacle 1, its surface raising the float 20 until the valve-seat 17 on the arm 16 is forced against the inner open end of the supply-pipe 10, thus shutting off any further supply of water. As the generating of steam in the receptacle 1 commences in the process of cooking the surface of the water is necessarily lowered, causing the float 20 to descend. This action causes the valve-seat 17 to recede from the supply-pipe, thus permitting a further supply of water until the former level is restored, when the water is again shut off. The action of the valve 20 and its counterweight 21 is so delicate that any diminution of the water in the receptacle 1 by its conversion into steam is almost instantly replaced. Consequently the water is at all times kept at a practically constant level, which is predetermined by the position of the inner open end of the supply-pipe 10. This supply-pipe 10 is, as seen, adjustable in its bearings, and to change the constant level of the water in receptacle 1 it is only necessary to adjust the position of the supply-pipe 10 horizontally. For example, if it is desired to raise this level the supply-pipe can be adjusted to the right any distance required after loosening the lock-nuts. This increases the play of the pivoted arm 16 and permits the float 20 to rise to a correspondingly-higher position before valve 17 seats against the inner end of pipe 10, thus increasing the constant level to the required height. A reversal of movement of the supply-pipe 10 will cause a correspondingly-lower constant level to be maintained.

I claim—

A steam-cooker consisting essentially of the cylindrical steam-generating receptacle 1, the annular supply-reservoir 2 for water, surrounding the cylindrical steam-generating receptacle and communicating therewith, automatic means for maintaining a practically constant supply of water from the supply-reservoir to the steam-generating receptacle a cylindrical cover 6 forming the cooking-chamber, the lower portion of which rests in and is surrounded by the water in the supply-reservoir 2 to form a steam-tight joint, and adjustable means for varying the supply of water to be automatically maintained in the steam-generating receptacle 1, all combined and operating as and for the purpose stated.

In testimony whereof I have signed my name to this specification in the presence of two subscribing witnesses.

CHARLES H. AMIDON.

Witnesses:
W. T. MILLER,
C. B. BUTLER.